United States Patent [19]

James et al.

[11] Patent Number: 4,823,134
[45] Date of Patent: Apr. 18, 1989

[54] SHIPBOARD ANTENNA POINTING AND ALIGNMENT SYSTEM

[75] Inventors: Michael R. James; John J. Maney, both of Palm Bay, Fla.

[73] Assignee: Harris Corp., Melbourne, Fla.

[21] Appl. No.: 181,114

[22] Filed: Apr. 13, 1988

[51] Int. Cl.$^4$ .................. H01Q 3/00; G01S 5/02
[52] U.S. Cl. ..................... 342/359; 342/422
[58] Field of Search ............ 342/359, 422, 420; 343/754, 757; 364/449, 460

[56] References Cited

U.S. PATENT DOCUMENTS 4,179,696 12/1979 Quesinberry et al. ............ 342/75

Primary Examiner—Theodore M. Blum
Assistant Examiner—Gregory C. Issing
Attorney, Agent, or Firm—Antonelli, Terry & Wands

[57] ABSTRACT

A mechanism for correcting for time-varying errors that affect the pointing accuracy of a shipboard mounted antenna employs a Kalman filter for realizing an optimal correction estimator through which inputs to the antenna aiming control hardware are adjusted. A series of coordinate system transformations, corrected by the Kalman filter error estimator, are carried out to provide a command input to an antenna pointing servo system. The servo control system produces a servo error signal representative of a deviation in the actual direction of the antenna pointing mechanism from the command input to the servo loop as defined by the corrected aiming signal. The actual direction in which the servo control system points the antenna is compared with a reference (the actual direction to the satellite). As a result of this comparison, a pointing deviation signal representative of any offset from the intended pointing direction is generated. Because this pointing deviation signal depends upon the output of the servo control mechanism, it inherently contains any error in that output. Such error is removed by subtracting the servo error signal from the pointing deviation signal and applying the resultant difference signal to the Kalman filter error estimator.

18 Claims, 5 Drawing Sheets

SHIPBOARD ANTENNA POINTING AND ALIGNMENT SYSTEM

FIELD OF THE INVENTION

The present invention relates in general to orientation control systems and is particularly directed to a mechanism for correcting for systematic errors in a shipboard antenna control system.

BACKGROUND OF THE INVENTION

The ability to accurately point a shipboard-mounted antenna at a remote target (e.g. satellite) is limited by (open-loop) time varying errors that are introduced into the control mechanism by a number of physical parameters, such as ship motion, structural integrity of the antenna mount, and temperature-induced changes in deck shape. Moreover, in practice, errors such as variations in ship and support structure cannot be calibrated out, thereby effectively preventing accurate continued alignment of the components of the control hardware. In the past, these inaccuracies have been tolerated by mounting such antennas on large ships, such as carriers, battleships and cruisers, that are subject to minimum wave-induced motion, and by using antennas that possess wide aperture and control loop bandwidth characteristics. Present-day shipboard communication systems, however, are not limited to use with only specific types of platforms; all units of the fleet can be expected to have satellite communication capability. In addition, because of the new high frequencies and link characteristics, aperture size and signal-to-noise ratio have shrunk, thereby mandating more precise control of both antenna installation and pointing accuracy. Unfortunately, because of their limited bandwidth, conventional autotrack loops, which are adequate to track the satellite, are effectively incapable of nulling the above-referenced time-varying pointing errors.

SUMMARY OF THE INVENTION

In accordance with the present invention two basic problems associated with such orientation control systems are solved. Specifically, with time varying rotations among the multiple coordinate frames through which the ship board antenna line-of-sight axis to the satellite is referenced, static corrections in one coordinate frame cannot remove dynamic errors due to static errors in another coordinate frame. In addition to be effective the correction mechanism must accurately allocate each one—or two-dimensional error measurement among the plurality of corrections for error sources. The present invention achieves these objectives by providing a mechanism for effectively correcting for measurable static or time-varying errors that may affect the pointing accuracy of a shipboard mounted antenna, through the use of a Kalman filter for realizing an optimal correction estimator through which time-varying inputs to the antenna aiming control hardware are adjusted. For this purpose a first antenna aiming/orientation signal, representative of the position of the satellite in space relative to the location of the antenna, the attitude of the ship-structure on which the antenna is mounted, and the orientation of the antenna as mounted on the said structure is produced. Because the ship motion induces time-varying errors in the parameters of the first signal when there are static errors in the inputs used to produce the first signal, it is necessary to impart a correction for each such error in the first signal. Using a Kalman filter error correction estimator, a second signal, representative of an estimate of the necessary correction or modification of the first signal, is generated. This correction signal is combined with the first signal to produce a third signal representative of a modified (corrected) version of the first signal.

The resultant error-compensated aiming signal is applied to an antenna pointing mechanism, having a servo control loop which produces an output for pointing the antenna at the satellite. The servo control system produces a fourth signal representative of a deviation in the direction in which the antenna pointing mechanism is manipulated to point the antenna at the satellite from the pointing direction input to the servo loop as defined by the corrected aiming signal. The actual direction in which the servo control system causes the antenna aiming mechanism to be manipulated, so as to point the antenna at the satellite, is compared with the actual line-of-sight (LOS) from the antenna to the satellite. As a result of this comparison, a pointing deviation signal representative of any offset from the intended pointing direction is generated. Because this pointing deviation signal depends upon the output of the servo control mechanism, it inherently contains any error in that output. Such error is removed by subtracting the servo position error from the pointing deviation signal and applying the resultant difference signal to the Kalman filter error estimator, which also monitors all of the inputs which participate in the production of the first signal and the output of the servo control mechanism in the course of producing the error correction estimates.

DETAILED DESCRIPTION

Figure 1:
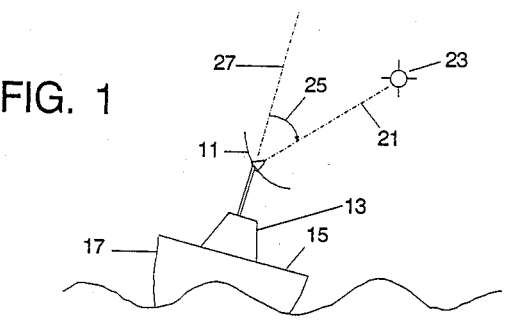
FIGS. 1-4 diagrammatically illustrate a satellite antenna affixed to a support structure mounted to the deck of a ship.

Before describing in detail the particular improved shipboard antenna pointing and alignment system in accordance with the present invention, it should be observed that the present invention resides primarily in a novel structural combination of conventional antenna mounting and positioning hardware and associated servo control system and components and not in the particular detailed configurations thereof. Accordingly, the structure, control and arrangement of such hardware and components have been illustrated in the drawings by readily understandable block diagrams which show only those specific details that are pertinent to the present invention, so as not to obscure the disclosure with structural details which will be readily apparent to those skilled in the art having the benefit of the description herein. Thus, the block diagram illustrations of the Figures do not necessarily represent the mechanical structural arrangement of the exemplary system, but are primarily intended to illustrate the major structural components of the system in a convenient functional grouping, whereby the present invention may be more readily understood.

Figure 2:
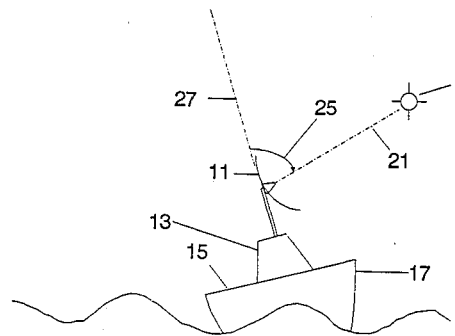

In order to facilitate an understanding of the satellite tracking and calibration mechanism of the present invention, it is initially useful to briefly examine characteristics and behavior of the satellite antenna when mounted on a shipboard platform. For this purpose, FIG. 1 diagrammatically illustrates a satellite antenna 11 affixed to a support structure 13 that is mounted to the deck 15 of a ship 17. Antenna 11 is manipulated by an aiming mechanism (not shown), so that the boresight 21 of the antenna points at a remote target (satellite) 23. As can be seen from a comparison of FIG. 1 and FIG. 2, depending upon the attitude of the ship 17, the angle 25 which the antenna boresight 21 makes with the vertical axis 27 of the pedestal of the antenna mount will vary.

Figure 3:
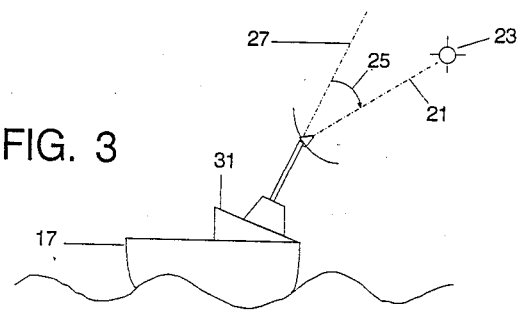
Figure 4:
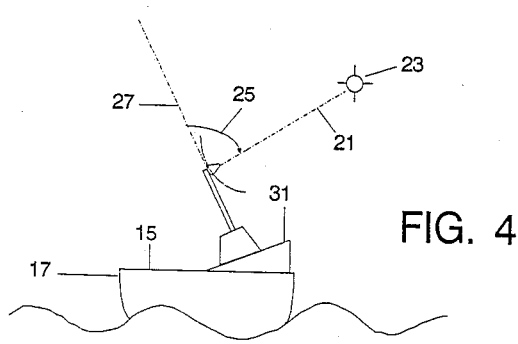
Figure 5:
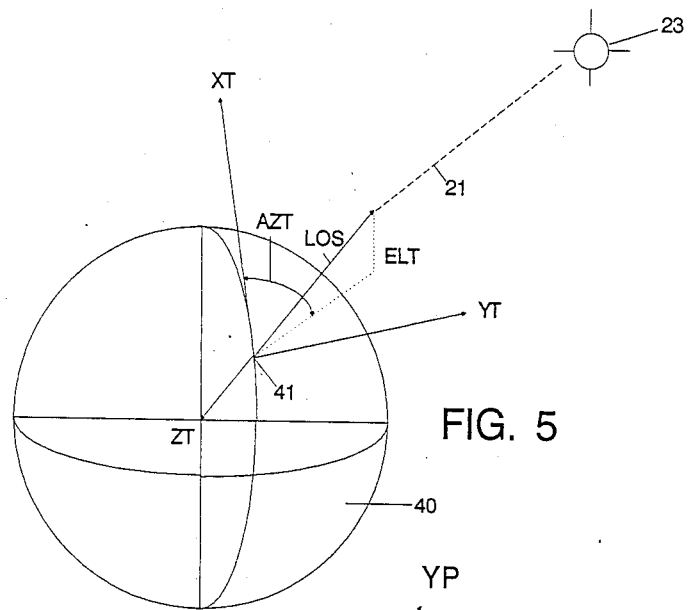
FIGS. 5-8 respectively show an earth-to-satellite topocentric coordinate system, a ship deck coordinate system, an antenna mount coordinate system and a perspective illustration of relationships among antenna axes angles and mount orientation angles.

In the diagrammatic illustration of FIGS. 3 and 4, the antenna pedestal, through which the antenna is manipulated, rather than being mounted directly on the deck of the ship, is mounted on a separate support structure 31, which is inclined or offset relative to the deck 15 of the ship 17. Such a mounting configuration introduces an additional coordinate conversion exercise which must be carried out in the course of aiming the antenna boresight relative to the position and attitude of the ship on earth. The coordinate systems which are used for this purpose are diagrammatically illustrated in FIGS. 5-8 which respectively show an earth to satellite topocentric coordinate system, a ship deck coordinate system, an antenna pedestal or mount coordinate system and a perspective illustration of the relationships among the antenna axes angles and the mount orientation angles. The coarsest pointing coordinate system, shown in FIG. 5, assumes that the location of the antenna is fixed, without taking into account any deviations in the manner in which the antenna is mounted or the fact that it is supported on a structure (ship deck) whose orientation with respect to the satellite is dynamic (time variant). In FIG. 5, the geographical location of the antenna is denoted at point 41 on the surface of a sphere 40, from which emanate respective rectangular coordinate axes XT, YT and ZT. The boresight or line of sight (LOS) from location 41 to the satellite 23 has respective azimuth AZT and elevation ELT angles through which the boresight may be defined relative to the rectangular topocentric coordinate system.

Figure 6:
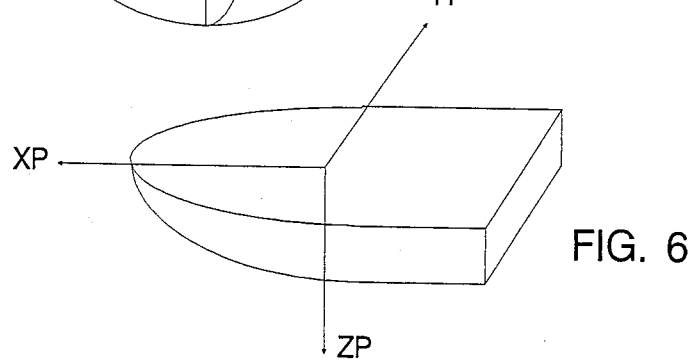

At location 41, the antenna is mounted on the deck of a ship, the coordinate system for which is illustrated in FIG. 6 as (XD, YD, ZD). At the origin of this coordinate system an antenna mount of pedestal coordinate system diagrammatically shown in FIG. 7 as having respective gimbal component axes (XM, YM, −ZM) is located.

Figure 7:
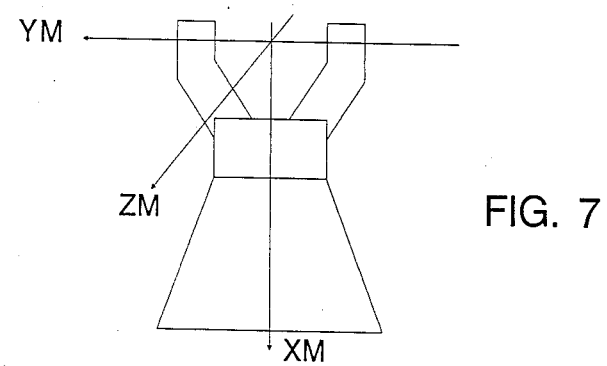
Figure 8:
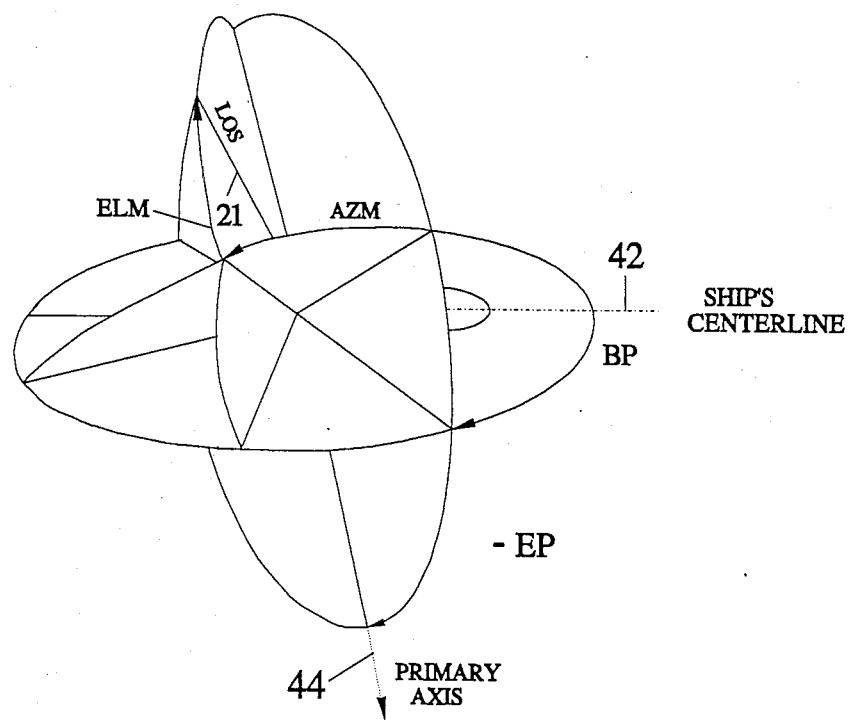

When mounted for three dimensional orientation on the deck of the ship, the boresight 21 of the antenna may be defined in terms of the respective coordinate systems using the geometry relationships illustrated in FIG. 8. In particular, relative to the centerline 42 of the ship, there is a deck-referenced bearing BP of a primary axis 44, and a deck-referenced elevation EP of the primary axis. The primary antenna axis angle (azimuth) is denoted by AZM while a secondary antenna axis angle (elevation) is denoted by angle ELM (each of the primary and secondary antenna axes angles being defined relative to the mount coordinate system of FIG. 7).

In the course of aiming the boresight of the antenna from its mounting location on its support structure atop the deck of the ship, the plurality of inputs are used to control the operation of a sequence of coordinate conversion from which a servo-mechanism control signal is generated for effecting three dimensional movement of the antenna and pointing of the antenna at the satellite. Because, however, ship motion acting on static errors in each of the inputs through which the series of coordinate conversions is carried out causes time varying errors, it is necessary to apply quasi-static corrections to those errors in order to point and keep the antenna aimed at the satellite.

Pursuant to the invention, these corrections are generated using a Kalman filter operator which combines outputs from a plurality of sensors associated with the mounting and pointing components of the antenna/ship hardware and error signals from the servo-mechanism for producing an optimal set of corrections through which each of the respective inputs to the coordinate conversion sequence is modified for minimizing errors in the pointing of the antenna toward the satellite.

Figure 9:
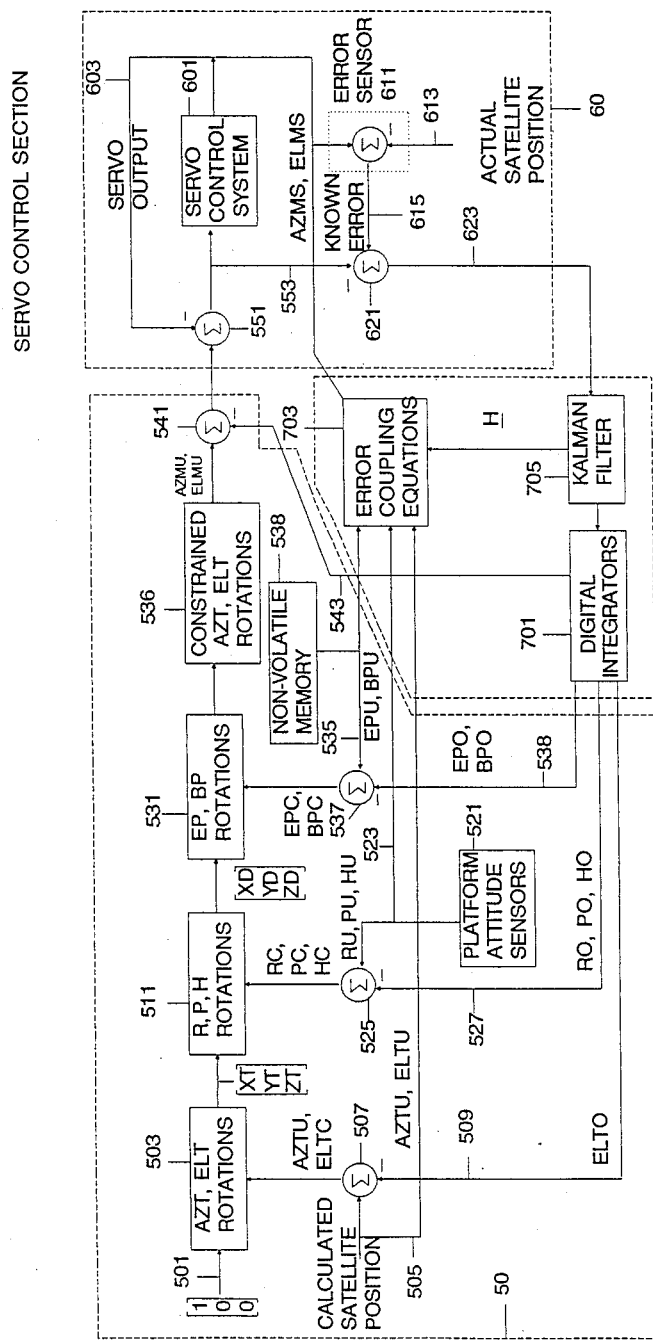
FIG. 9 is a diagrammatic illustration of an error correction system in accordance with the present invention.

A diagrammatic illustration of such an error correction system in accordance with the present invention is shown in FIG. 9 as comprising a coordinate conversion section 50, a servo-control section 60 and error estimator section 70.

Coordinate conversion section 50 generates an antenna aiming command signal by rotating a constant unit vector input signal through a series of coordinate system transformations that reflect the respective orientation geometries of FIGS. 5, 6 and 7, corresponding to target (satellite) position, roll, pitch and heading of the ship, and the orientation of the antenna support structure. For this purpose, a unit vector signal [1,0,0] is coupled via an input link 501 to a first transformation operator 503 which converts (rotates) the unit vector signal through a pair of input angles signals AZT, ELT representative of respective topocentric (referenced to true north and the horizon) azimuth and elevation values of a projected line-of-sight to the satellite. The position of the satellite is effectively fixed in space (or moving very slowly) and that position, relative to the location of the ship, as calculated by a separate unit (not shown), is supplied in the form of a pair of uncorrected (U) reference inputs AZTU, ELTU over input link 505 to one input of a subtraction or difference operator 507. A second input to difference operator 507 is coupled over link 509 from integrator unit 701 within error estimator unit 70 and represents an elevation offset ELTO for correcting the reference initial uncorrected line-of-sight representative elevation angle ELTU. The uncorrected satellite position values AZTU, ELTU on input link 505 are also coupled as inputs to an error coefficient generator 703 within error estimator section 70.

The azimuth and elevation transformation values generated by operator 503, in terms of the coordinate system shown in FIG. 5, are coupled to a roll, pitch and heading transformation operator 511, which converts the unit vector supplied by operator 503 into coordinate values within the coordinate system of FIG. 6, which coordinate system has been corrected by estimator 70. Respective (uncorrected) roll, pitch and heading values (RU, PU and HU) of the ship are derived by a set of platform sensors 521 and coupled over link 523 as a first set of inputs to a difference or subtraction operator 525, a second set of correction or offset inputs (RO, PO and HO) to which are coupled over link 527 from error estimator section 70. The platform sensor outputs are further coupled over link 523 as inputs to error coefficient generator 703 within error estimator section 70.

The correction or offset values (RO, PO and HO) are subtracted from the raw data supplied by the platform sensors 521, so that a set of corrected roll, pitch and heading values (RC, PC and HC) of the ship are coupled as reference inputs to transformation operator 511. As noted previously, transformation operator 511 converts or rotates the unit vector supplied by operator 503 into a new set of coordinates corresponding to the coordinate system of the ship shown in FIG. 6. As a consequence of this second transformation the antenna (line-of-sight) position command is defined relative to a 'corrected' ship attitude frame of reference.

The output of transformation operator 511 is coupled to an antenna mount transformation operator 531 which converts the antenna pointing parameters in the ship's attitude coordinate system (FIG. 6) into a further set of coordinates referenced to the ship's antenna mount, the coordinate system for which is illustrated in FIG. 7. When the antenna and its associated mount are initially installed, the effective mounting position of the antenna relative to the deck of the ship is approximately measured and stored in a non-volatile memory 533, in terms of the elevation of the primary axis (EPU) and the bearing of the primary axis (BPU) of the antenna. (It should be noted that it is extremely difficult, if at all practically possible, to measure EPU and BPU of the antenna by any means other than the orientation control/correction mechanism of the present invention.)

As noted previously, because of physical changes in the mount hardware over the course of time, the initially measured and stored values can be expected to change and, accordingly, require correction by estimator section 70. For this purpose, the base parameters (EPU and BPU) are coupled over link 535 to error coefficient generator 703 of error estimator section 70 and to a first input of a further difference or subtraction operator 537, a second input of which is coupled to receive correction offset values (EPO and BPO) over link 538 from integrator unit 701 of error estimator section 70. In subtraction operator 537 the originally measured values are corrected in accordance with the mount offset values to produce a set of corrected antenna mount orientation values EPC and BPC which are coupled as coordinate reference inputs to antenna mount transformation operator 531. As noted above, antenna mount transformation operator 531 converts the antenna pointing parameters in terms of the ship's attitude coordinate system (FIG. 6) into a set of coordinates (corrected in accordance with the offset values supplied by estimator section 70) referenced to the ship's antenna mount, the coordinate system for which is illustrated in FIG. 7.

The antenna mount-transformed vector output by transformation operator 531 is coupled to azimuth and elevation angle converter 536 wherein the vector is converted into a set of angular coordinates representative of uncorrected mount azimuth (AZMU) and elevation (ELMU) (relative to the antenna mount coordinate system of FIG. 7) and coupled to one input of a difference or subtraction operator 541 a second input of which, representative of azimuth and elevation offsets (AZMO, ELMO) is supplied over link 543 from integrator unit 701 of error estimator section 70. The output of difference operator 541 represents the desired boresight of the antenna and is employed as a command signal to antenna manipulation servo control section 60.

More particularly, the command signal output of difference operator 541, representative of corrected boresight azimuth and elevation angles referenced to the antenna mount coordinate system (FIG. 7), is coupled as a first input to a difference or subtraction operator 551, a second input of which is derived over link 603 from the output of the servo control system 601 that physically manipulates (points) the antenna and which corresponds to the actual gimbal angles at which the servo system believes that it has positioned the antenna. The output of operator 551 thus represents any deviation between the actual antenna position angles sensed by the servo control system 601 and the position angles that the antenna has been commanded to be pointed to by coordinate conversion system 50. The servo output signal on link 603 is coupled as a further input to error coefficient generator 703 within error estimator section 70.

The servo output signal on link 603 is further coupled as a first input to an error sensing device 611, a second (reference) input of which, supplied over link 613, is the true line-of-sight to the satellite. Any difference between the two inputs yields a pointing deviation signal representative of any angular error. Because this pointing deviation signal depends upon the angular position output of the servo control mechanism, it inherently contains any error in that output. Such error is removed by subtracting the servo position error, supplied by operator 551, from the pointing deviation signal output of operator 611 and applying the resultant difference signal to the Kalman filter error estimator section 70. For this purpose, the output of operator 551 on link 553 is coupled as a first input to difference operator 621, a second input of which corresponds to the observed error output on link 615 from operator 611. The output of difference operator 621 is coupled over link 623 to a Kalman filter operator 705 within error estimator section 70, which produces the offsets for adjusting the respective coordinate system transformations described above.

As shown diagrammatically in FIG. 9, error estimator section 70 comprises three functional units: 1-error oefficient generator 703, 2-Kalman filter operator 705 and 3-integrator unit 701. Error coefficient generator 703 monitors the entire geometric state and the signals representative of the sources of error in the system and provides to Kalman filter operator 705 a set of coefficients in accordance with which each of the error sources couple into the azimuth and elevation components of tracking error. In Kalman filter operator 705 these coefficients (H) are used to apportion the sensed tracking error into contributions from the respective error sources. The contributions are then integrated by integrator unit 701 to form the alignment and satellite location offset signals, described above. The manner in which each of the functional components of error estimator section 70 executes its respective signal processing function will be described below.

Figure 10:
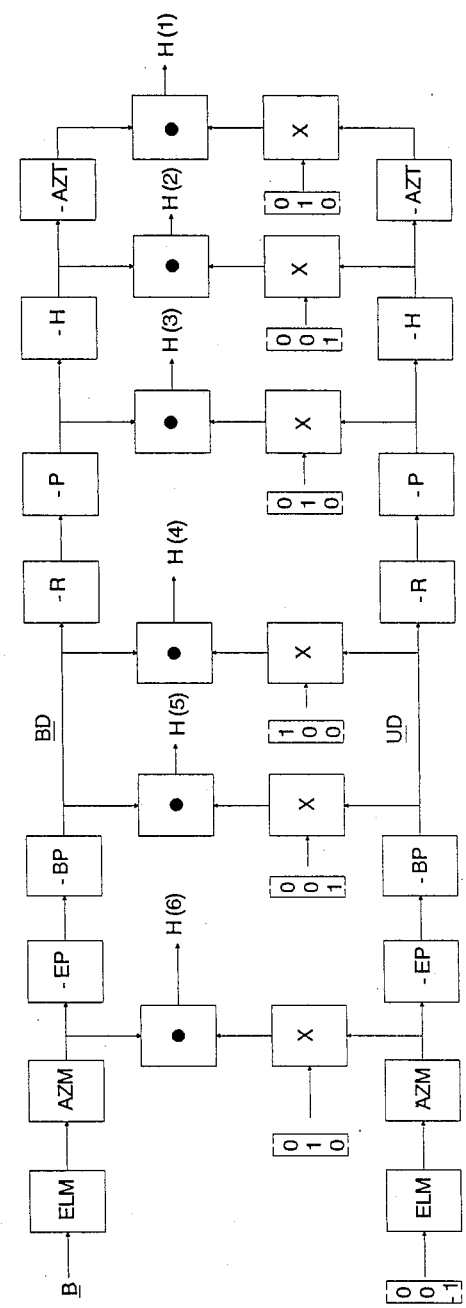
FIG. 10 diagrammatically illustrates signal processing equations for error coefficient generation by the error estimator section of the system diagram of FIG. 9.

As pointed out above, in order for Kalman filter operator 705 to apportion the observed tracking error among the respective components of the system, a set of coefficients by which each of the error sources couple into azimuth and elevation components of tracking error is required. These coefficients are partial derivatives of the mount position angle commands with respect to the coordinate conversion rotation angles and may be readily computed as the dot products of unit vectors in the direction of the elevation and cross-elevation (azimuth) error components and the vector derivatives of the boresight (line-of-sight) unit vector with respect to the axes of the rotations in the coordinate conversion process. This process may be carried out using the functional flow sequence of FIG. 10, which diagrammatically illustrates the signal processing equations set forth below. In the notation used the following definitions are employed:

AZT=Topocentric azimuth and elevation,
R, P, H=Ship's Roll, Pitch, Heading, EP=Deck-referenced elevation of antenna primary axis (azimuth),
BP=Deck-referenced bearing of antenna primary axis,
AZM=Antenna mount azimuth angle,
ELM=Antenna mount elevation angle,
VECTORS and MATRICES=Vector, [Matrix], In addition, the series of rotations and vector dot products and cross-products are represented by a series of boxes each of which contains an angle value, a dot (.) or a cross (X). The vector B is $[-100]^T$ for an elevation error measuement, or $[010]^T$ for a cross-elevation error measurement. [AZMS][ELMS]B is a unit vector in the coordinate system of the antenna mount in the direction of either the elevation or cross-elevation component, while $[AZMS][ELMS][00-1]^T$ is the boresight unit vector in mount coordinates. The top and bottom flow paths in FIG. 10 perform reverse coordinate conversion on B and the boresight vector. The constant vectors entering the cross products are the axes of the various coordinate conversion rotations of the functional system diagram of FIG. 9. The cross products of the rotation axes and the boresight vector are the partial derivatives of the boresight vector with respect to the angles of rotation. Taking the dot product with B (rotated into the proper frame of reference) yields the coupling factor between a deviation (error) in a coordinate conversion rotation angle and the elevation or cross-elevation error component.

UD=[−BPU][−EPU][AZMS][ELMS][00−1]$^T$
IF MEASUREMENT AXIS=ELEVATION THEN
  B=[−100]$^T$
  H(8)=1
  H(7)=0
  ERR=ELEVATION TRACKING ERROR COMPONENT
ELSE
  B=[010]$^T$
  H(8)=0
  H(7)=COS(ELMS)
  ERR=CROSS-EL TRACKING ERROR COMPONENT
END IF
BD=[−BPU][−EPU][AZMS][ELMS]B
H(6)=[AZMS][ELMS]B·{[AZM-][ELMS][00−1]$^T$X[010]$^T$}
H(5)=BD·{UDX[001]$^T$}
H(4)=BD·{[100]$^T$XUD}
H(3)=[−PU][−RU]BD·{[010]$^T$X[−PU][−RU]UD}
H(2)=[−HU][−PU][−RU]BD·{[−HU][−PU][−RU]UDX[001]$^T$}
H(1)=[−AZTU][−HU][−PU][−RU]BD·{[−AZTU][−HU][−PU][−RU]UDX[010]$^T$}.

The H(i) outputs of coefficient generator 703 are coupled to Kalman filter operator 705, which proceeds to execute the series of signal processing operations set forth below, using the following notation:
[θ]=Rotation matrix for angle theta,
B=El or cross-el error component basis vector,
BD=B in deck coordinates,
UD=Line-of-sight vector, in deck coordinates,
ERR=El or cross-el tracking error measurement,
H=Error coupling coefficients,
K=Kalman gain coefficients,
R=Error measurement noise covariance,
[M], [P]=Estimate error covariance matrices,
[M]=Before measurement update, [P]=after measurement update
X(I)=Kalman filter states=estimated residual misalignments,
OFF(I)=Integrator outputs=offsets to coordinate conversion angles,
F=Control system state transition constant, and
[Q]=Process noise covariance matrix.

Kalman Filter Operator

Step (1): Calculate Kalman Gain Coefficients
$K=\{1/(H\cdot[M]H+R)\}[M]H$
Step (2): Measurement Update $X(I)=X(I)+\{ERR-H\cdot X(I)\}K$ $[P]=[M]-[OUTER\ PRODUCT(K,H)][M] OFF(I)=OFF(I-1)+\{ERR-H\cdot X(I)\}K$
Step (3): Time Update
$X(i+1)=(F)X(I)$
$[M]=[P]+[Q]$.

In step (1), Kalman filter operator 705 calculates the Kalman gain coefficients based on the error coupling coefficients H, the error covariance matrix [M] and the measurement noise variance R. Scalar, rather than matrix inversion, is used since the error measurement is one dimensional.

In step (2), the residuals and outputs of integrator 701 are updated based upon the new information from the new error measurement. Error covariance matrix [P] is updated using the current Kalman gain coefficients and the current error coupling coefficients.

In step (3), the residuals and the error covariance matrix are updated to account for the increase in uncertainty during the interval prior to the next iteration. F is a scaler constant representing the response time of the servo control system to changes in alignment offsets used in the course of pointing of the antenna. [Q] is a constant matrix for setting the value of steady state Kalman gains and prevents the gains from settling to zero, thereby keeping the error estimator responsive to satellite motion and any changes in the physical parameters of the antenna pointing mechanism.

In addition to the implementation of the Kalman filter (705, FIG. 9) described above, this correction operator may also be effected using a "square root" signal processing mechanism. Such a "square root" operator is predicated on the fact that the covariance matrix P can be represented as the "square" of another matrix S, i.e. $P=SS^T$, with S being the "square root" matrix. If this matrix S is updated by its corresponding equations (instead of those for P described supra), then round-off errors and word length requirements are reduced. However, real-time performance is descreased somewhat due to the use of more complex update equations.

As such "square root" signal processing mechanism are well documented in the literature, no details will be presented here.

For exemplary reference purposes however, attention may be directed to "Stochastic Models, Estimation, and Control" by P. S. Maybeck, Vol. 1, chapter 7, Academic Press, 1979.

Target Re-Initialization Mechanism

After the error correction system of the present invention has been operating for a period of time in connection with the tracking of one target and it is desired to track a new target, the error correction parameters must be updated. This update ensures that the estimator is informed of the new target, thereby improving upon estimator accuracy and preventing estimator divergence.

For this purpose, let it be assumed that the following states (unknown Kalman filter quantities X(I)) are to be estimated:

$$X(I) = \begin{bmatrix} ELT \\ AZT \\ \hline X_1 \end{bmatrix} \begin{matrix} \\ \\ n-2 \end{matrix} \quad \text{dimensions of vectors:} \quad \begin{matrix} n = \dim(X) \\ n-2 = \dim(X_1) \end{matrix}$$

When a new target is to be tracked, ELT/AZT errors will change, but the $X_1$ quantities will not change (the tracking system itself has not changed). Namely $$\hat{X}_{old} = \begin{bmatrix} E\hat{L}T \\ A\hat{Z}T \\ \hline X_1 \end{bmatrix} \rightarrow \text{changes to } \hat{X}_{New} = \begin{bmatrix} 0 \\ 0 \\ \hline X_1 \end{bmatrix}$$

wherein:

$\hat{x}$ = estimates of X quantities (residuals), and the initial estimate for new target error is zero (assumed). Also, the digital integration for the new target must be reset.

In addition, the covariance matrix [P] must be updated. The old covariance matrix is by definition:

$$[P_{old}] = E\{\hat{X}_{old}\hat{X}_{old}^T\} =$$

$$\begin{bmatrix} E\left\{\begin{bmatrix} E\hat{L}T \\ A\hat{Z}T \end{bmatrix}[E\hat{L}T\;A\hat{Z}T]\right\} & E\left\{\begin{bmatrix} E\hat{L}T \\ A\hat{Z}T \end{bmatrix}X_1^T\right\} \\ \hline E\left\{\hat{X}_1[E\hat{L}T\;A\hat{Z}T]\right\} & E\{X_1 X_1^T\} \\ 2 & n-2 \end{bmatrix} \begin{matrix} \}2 \\ \\ \}n-2 \end{matrix}$$

where E{*} is the expected value and the expected value of a matrix equals the matrix of expected values of individual entries in the matrix. Using this definition, then $$[P_{NEW}] = E\{\hat{X}_{NEW}\hat{X}_{NEW}^T\} =$$

$$\begin{bmatrix} \sigma^2_{ELT} & 0 & \\ 0 & \sigma^2_{AZT} & 0\;(2w \times (n-2) \text{ zero matrix}) \\ & 0 & \\ ((n-2) \times 2 \text{ zero matrix}) & & E\{\hat{X}_1 \hat{X}_1^T\} \end{bmatrix}$$

where the four sub-matrices are the same as in its $[P_{old}]$ case, $\sigma^2_{ELT}$ is the variance in the initial estimate of the target EL error, and $\sigma^2_{AZT}$ in the variance in the initial estimate of target AZ error. It is also assumed that the new target errors are independent (uncorrelated) between EL/AZ and are independent of $X_1$ states and previous target errors. The $[P_{NEW}]$ relationship can be verified by substitution into the definition of the covariance matrix and using the independence assumptions.

As a consequence, the reinitialization mechanism:

1. Zeroes out (resets) the first two elements of and the target correction digital integrators, (701, FIG. 9);

2. Zeroes out the off-diagonal block sub-matrices in [P];

3. Replaces the 2×2 upper left block sub-matrix with the $$\text{matrix} \begin{bmatrix} \sigma^2_{EL} & 0 \\ 0 & \sigma^2_{AZ} \end{bmatrix}; \text{and}$$

4-leaves the $X_1$ states and their corresponding covariance sub-matrix unchanged.

In terms of the notation of the Kalman filter error correction signal processing mechanism described above, reinitialization of target position corrections may be defined by partitioning the [P] matrix into:

:[UL][UR]:
:[LL][LR]:

where: the target position corrections are the first two elements of the n-dimensional correctio vector; [UL] is a 2×2 matrix; [UR] is a 2×(n−2) matrix; [LL] is a (n−2)×2 matrix; and [LR] is an (n−2)×(n=2) matrix.

$$[S_{OLD}] = \begin{bmatrix} S_1^T \\ S_2^T \\ \hline S_3 \end{bmatrix} \begin{matrix} \}2 \\ \\ \}n-2 \end{matrix}, \text{where}$$

$S_3 = (n-2) \times n$ matrix

Noting that $[P_{OLD}] = [S_{OLD}][S_{OLD}]^T$ $$= \begin{bmatrix} S_1^T S_1 & S_1^T S_2 & S_1^T S_3 \\ S_2^T S_1 & S_2^T S_2 & S_2^T S_3 \\ S_3 S_1 & S_3 S_2 & S_3 S_3^T \\ 2 & & n-2 \end{bmatrix} \begin{matrix} \}2 \\ \\ \}n-2 \end{matrix}$$

and recalling that the lower right hand block remains the same, then $S_3$ remains unchanged. Thus, new rows one and two ($S^T_1, S^T_2$) are selected such that:

$$\left.\begin{matrix} S_1^T S_1 = \sigma^2_{ELT} \\ S_2^T S_2 = \sigma^2_{AFT} \end{matrix}\right\} \text{Defines length of vectors}$$

$S^T_1 S_2 = 0$, $S_1$ is orthogonal to $S_2$ $S^T_1 S_3 = S^T_2 S_3 = 0$, $S_1, S_2$ are orthogonal to all other columns $S_1$, $S_2$ may be selected by use of a conventional Gram-Schmidt algorithm (referenced on page 378 of the Maybeck publication). There are always an $S_1$ and $S_2$ that meet these requirements, since The sequence of steps to be carried out is:
[UL]=0
[UR]=0
[LL]=0
P(1,1)=variance of the initial estimate of the target elevation position correction; and
P(2,2)=variance of the initial estimate of the target azimuth position correction.

Where a "square root" signal processing mechanism is employed for the Kalman filter operator, target reinitialization may be adjusted using either of the following two approaches.

1. When a new target is to be tracked, $[P_{old}]$ is defined by $$[P_{old}] = [S_{old}][S_{old}]^T \text{ and}$$

$[P_{old}]$ is converted to $[P_{NEW}]$ by the procedure described above. $[S_{NEW}]$ is then defined as the square root of the matrix $P_{NEW}]$ such that $$P_{NEW}] = [S_{NEW}][S_{NEW}]^T$$

by using, for example, the procedure described in the above-referenced Maybeck publication. It should be noted that high precision (long word lengths) must be used in order to avoid losing the advantage of the square root approach.

2. The old square root matrix $[S_{old}]$ may be partitioned as follows: the rows in $S_3$ span only $n-2$ dimensions of n-space, so that a two-dimensional subspace must remain.

As will be appreciated from the foregoing description, the present invention provides an effective mechanism for correcting for measurable time-varying errors that may affect the pointing accuracy of a shipboard mounted antenna, through the use of a Kalman filter for realizing an optimal correction estimator through which static or slowly varying inputs to the antenna aiming control hardware are adjusted.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A method of orienting a mechanism with respect to a target, said mechanism being mounted on a support structure having an orientation that is subject to variation with respect to time comprising the steps of:
    (a) generating a prescribed coordinate system vector representative signal through which the orientation of said mechanism is to be controlled for orienting said mechanism with respect to a target and translating said vector representative signal through at least one coordinate system transformation;
    (b) generating at least one mechanism orientation parameter representative signal in accordance with which said vector representative signal is translated in step (a);
    (c) modifying said at least one mechanism orientation parameter representative signal in accordance with a correction signal representative of an estimated error in said at least one mechanism orientation parameter and generating therefrom at least one modified signal through which said vector representative signal is translated in step (a);
    (d) applying said translated vector representative signal as a command signal to a mechanism orientation servo control system by way of which the orientation of said mechanism with respect to said target is controlled, said servo control system producing a servo error signal representative of an error in the orientation of said mechanism as sensed by the servo control system with respect to said command signal;
    (e) comparing the actual orientation of said mechanism to the ideal orientation with respect to said target and generating an orientation difference signal representative of the difference therebetween;
    (f) generating an error difference signal representative of a difference between said error output signal and said orientation difference signal; and
    (g) applying said at least one mechanism orientation parameter representative signal and said error difference signal to a mechanism orientation error estimator through which said correction signal is generated.

2. A method according to claim 1, wherein step (g) comprises the step of applying said at least one mechanism orientation parameter representative signal and said error difference signal to a Kalman filter signal processor through which said correction signal is generated.

3. A method according to claim 1, wherein said mechanism comprises a shipboard mounted antenna that is to be oriented so that its line-of-sight is pointed at a satellite.

4. A method according to claim 1, further including the step (h) of reinitializing the operation of said mechanism orientation error estimator in accordance with a change in target with respect to which said mechanism is to be oriented.

5. A method of orienting a mechanism with respect to a target comprising the steps of:
    (a) generating a prescribed coordinate system vector representative signal through which the orientation of said mechanism is to be controlled for orienting said mechanism with respect to a target and translating said vector representative signal through at least one coordinate system transformation;
    (b) generating at least one mechanism orientation parameter representative signal in accordance with which said vector representative signal is translated in step (a);
    (c) modifying said at least one mechanism orientation parameter representative signal in accordance with a correction signal representative of an estimated error in said at least one mechanism orientation parameter and generating therefrom at least one modified signal through which said vector representative signal is translated in step (a);
    (d) applying said translated vector representative signal as a command signal to a mechanism orientation servo control system by way of which the orientation of said mechanism with respect to said target is controlled, said servo control system producing a servo error signal representative of an error in the orientation of said mechanism as sensed by the servo control system with respect to said command signal;

(e) comparing the actual orientation of said mechanism to the ideal orientation with respect to said target and generating an orientation difference signal representative of the difference therebetween;

(f) generating an error difference signal representative of a difference between said servo error signal and said orientation difference signal; and (g) applying said at least one mechanism orientation parameter representative signal and said error difference signal to a Kalman filter error estimator through which said correction signal is generated.

6. A method according to claim 5, wherein said mechanism comprises an antenna that is to be oriented so that its line-of-sight is pointed at a remote target.

7. A method of pointing an antenna, that is mounted on a support structure having an orientation that is subject to variation with respect to time, at a target in space comprising the steps of:

(a) generating a prescribed coordinate system vector representative signal through which said antenna is to be controlled for pointing said antenna at said target and translating said vector representative signal through coordinate system transformations that define the position of said target in space relative to the location of said antenna, the attitude of the structure on which said antenna is mounted, and the orientation of said antenna as mounted on said structure;

(b) generating respective antenna orientation parameter representative signals representative of the position of said target in space relative to the location of said antenna, the attitude of the structure on which said antenna is mounted, and the orientation of said antenna as mounted on said structure in accordance with which said vector representative signal is translated in step (a);

(c) modifying said antenna orientation parameter representative signals in accordance with respective correction signals representative of estimated errors in said antenna orientation parameters and generating therefrom respective modified signals through which said vector representative signal is translated in step (a);

(d) applying said translated vector representative signal as a command signal to an antenna pointing servo control system by way of which said antenna is pointed toward said target, said antenna pointing servo control system producing a servo error signal representative of an error in the actual pointing of said antenna as sensed by the servo control system, relative to the command signal;

(e) comparing the direction in which said antenna pointing servo control system points said antenna with the actual direction to the target and generating an antenna pointing difference signal representative of the difference therebetween;

(f) generating an error difference signal representative of a difference between said servo error signal and said antenna pointing difference signal; and (g) applying said antenna orientation parameter representative signals and said error difference signal to an error estimator through which said correction signals are generated.

8. A method according to claim 7, wherein said error estimator comprises a Kalman filter signal processor.

9. A method according to claim 7, further including the step (h) of reinitializing the operation of said error estimator in accordance with a change in target toward which said antenna is to be pointed.

10. A system for orienting a mechanism with respect to a target, said mechanism being mounted on a support structure having an orientation that is subject to variation with respect to time comprising:

first means for generating a prescribed coordinate system vector representative signal through which the orientation of said mechanism is to be controlled for orientating said mechanism with respect to a target and translating said vector representative signal through at least one coordinate system transformation;

second means for generating at least one mechanism orientation parameter representative signal in accordance with which said vector representative signal is translated by said first means;

third means, coupled to said second means, for modifying said at least one mechanism orientation parameter representative signal in accordance with a correction signal representative of an estimated error in said at least one mechanism orientation parameter and generating therefrom at least one modified signal through which said vector representative signal is translated by said first means;

fourth means, coupled to said first means, for applying said translated vector representative signal as a command signal to a mechanism orientation servo control system by way of which the orientation of said mechanism with respect to said target is controlled, said servo control system producing a servo error signal representative of an error in the actual orientation of said mechanism as sensed by the servo control system, with respect to said command signal;

fifth means, coupled to said fourth means, for comparing the actual orientation of said mechanism to the ideal orientation with respect to said target and generating an orientation difference signal representative of the difference therebetween;

sixth means, coupled to said fourth means and said fifth means, for generating an error difference signal representative of a difference between said servo error signal and said orientation difference signal; and seventh means for generating said correction signal, said seventh means being coupled to receive said at least one mechanism orientation parameter representative signal and said error difference signal.

11. A system according to claim 10, wherein said seventh means comprises a Kalman filter signal processor.

12. A system according to claim 10, wherein said mechanism comprises a shipboard mounted antenna that is to be oriented so that its line-of-sight is pointed at a satellite.

13. A system according to claim 10, wherein the operation of said mechanism orientation error estimator is reinitialized in accordance with a change in target with respect to which said mechanism is to be oriented.

14. A system for orienting a mechanism with respect to a target comprising:

first means for generating a prescribed coordinate system vector representative signal through which the orientation of said mechanism is to be controlled for orienting said mechanism with respect to a target and translating said vector representative signal through at least one coordinate system transformation;

second means for generating at least one mechanism orientation parameter representative signal in accordance with which said vector representative signal is translated by said first means;

third means, coupled to said second means, for modifying said at least one mechanism orientation parameter representative signal in accordance with a correction signal representative of an estimated error in said at least one mechanism orientation parameter and generating therefrom at least one modified signal through which said vector representative signal is translated by said first means;

fourth means, coupled to said first means, for applying said translated vector representative signal as a command signal to a mechanism orientation servo control system by way of which the orientation of said mechanism with respect to said target is controlled, said servo control system producing a servo error signal representative of an error in the actual orientation of said mechanism as sensed by the servo control system, with respect to said command signal;

fifth means, coupled to said fourth means, for comparing the actual orientation said mechanism to the ideal orientation with respect to said target and generating an orientation difference signal representative of the difference therebetween;

sixth means, coupled to said fourth means and said fifth means, for generating an error difference signal representative of a difference between said servo error signal and said orientation difference signal; and seventh means for generating said correction signal, said seventh means being coupled to receive said at least one mechanism orientation parameter representative signal and said error difference signal, said seventh means comprising a Kalman filter error estimator through which said correction signal is generated.

15. A system according to claim 14, wherein said mechanism comprises an antenna that is to be oriented so that its line-of-sight is pointed at a remote target.

16. A system for pointing an antenna, that is mounted on a support structure having an orientation that is subject to variation with respect to time, at a target in space comprising:

first means for generating a prescribed coordinate system vector representative signal through which said antenna is to be controlled for pointing said antenna at said target and translating said vector representative signal through coordinate system transformations that define the position of said target in space relative to the location of said antenna, the attitude of the structure on which said antenna is mounted, and the orientation of said antenna as mounted on said structure;

second means for generating respective antenna orientation parameter representative signals representative of the position of said target in space relative to the location of said antenna, the attitude of the structure on which said antenna is mounted, and the orientation of said antenna as mounted on said structure in accordance with which said vector representative signal is translated by said first means;

third means, coupled to said second means, for modifying said antenna orientation parameter representative signals in accordance with respective correction signals representative of estimated errors in said antenna orientation parameters and generating therefrom respective modified signals through which said vector representative signal is translated by said first means;

fourth means, coupled to said first means, for applying said translated vector representative signal as a command signal to an antenna pointing servo control system by way of which said antenna is pointed toward said target, said antenna pointing servo control system producing a servo error signal representative of an error in the actual pointing of said antenna as sensed by the servo control system, relative to the command signal;

fifth means, coupled to said fourth means, for comparing the direction in which said antenna pointing servo control system instructs said antenna with the actual direction to the target and generating an antenna pointing difference signal representative of the difference therebetween;

sixth means, coupled to said fourth means and said fifth means, for generating an error difference signal representative of a difference between said servo error signal and said antenna pointing difference signal; and seventh means for generating said correction signals in accordance with said antenna orientation parameter representative signals and said error difference signal.

17. A system according to claim 16, wherein said seventh means comprises a Kalman filter signal processor.

18. A system according to claim 17, wherein the operation of said seventh means is reinitialized in accordance with a change in target toward which said antenna is to be pointed.

* * * * *